United States Patent
Hoppermann et al.

(10) Patent No.: US 11,514,007 B1
(45) Date of Patent: Nov. 29, 2022

(54) DYNAMIC DATA PROCESSING FOR A SEMANTIC DATA STORAGE ARCHITECTURE

(71) Applicant: SAP SE, Walldorf (DE)

(72) Inventors: Simon Hoppermann, Walldorf (DE); Janick Frasch, Heidelberg (DE); Andre Sres, Winnweiler (DE); Masoud Aghadavoodi Jolfaei, Wiesloch (DE); Mirko Hin, Mannheim (DE); Roman Rommel, Neustadt an der Weinstrasse (DE); Brian McKellar, Heidelberg (DE); Steffen Knoeller, Neupotz (DE); Santo Bianchino, Schifferstadt (DE); Kuan Lu, Rauenberg (DE); Dominik Heere, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/356,914

(22) Filed: Jun. 24, 2021

(51) Int. Cl.
*G06F 16/00* (2019.01)
*G06F 16/21* (2019.01)
*G06F 16/245* (2019.01)
*G06N 20/00* (2019.01)
*G06F 16/951* (2019.01)
*G06F 16/25* (2019.01)

(52) U.S. Cl.
CPC .......... *G06F 16/213* (2019.01); *G06F 16/245* (2019.01); *G06F 16/252* (2019.01); *G06F 16/951* (2019.01); *G06N 20/00* (2019.01)

(58) Field of Classification Search
CPC .... G06F 16/213; G06F 16/245; G06F 16/252; G06F 16/951; G06N 20/00
See application file for complete search history.

(56) References Cited

U.S. PATENT DOCUMENTS

| | | |
|---|---|---|
| 2016/0092557 A1 | 3/2016 | Stojanovic et al. |
| 2017/0083547 A1* | 3/2017 | Tonkin .................. G06F 16/367 |
| 2018/0232426 A1* | 8/2018 | Gomez ................. G06F 16/258 |
| 2019/0354544 A1 | 11/2019 | Hertz et al. |

OTHER PUBLICATIONS

Extended European Search Report, counterpart EPC Patent Application No. 22165857.8, dated Oct. 7, 2022, 14 pages.
Le-Phuoc et al., "The Graph of Things: A Step Towards the Live Knowledge Graph of Connected Things," *WEB Semantics: Science, Services and Agents on the World Wide Web*, vol. 37-38, pp. 25-35, Mar. 1, 2016, 11 pages.
Deligiannis et al., "Hydria: An Online Data Lake for Multi-Faceted Analytics in the Cultural Heritage Domain," *Big Data and Cognitive Computing*, vol. 4(2), p. 7 et seq., Apr. 23, 2020, 28 pages.

* cited by examiner

*Primary Examiner* — Tyler J Torgrimson
(74) *Attorney, Agent, or Firm* — Klarquist Sparkman, LLP

(57) ABSTRACT

Computer-readable media, methods, and systems are disclosed for storing and analyzing dynamic data within a semantic data store. The dynamic data comprises one or more types of data having a normalized data schema. A dynamic data manager interfaces with the semantic data store to instruct storage of the data. The data may be received through an event service from either of an external data source or an internal data source.

20 Claims, 6 Drawing Sheets

US 11,514,007 B1

DYNAMIC DATA PROCESSING FOR A SEMANTIC DATA STORAGE ARCHITECTURE

BACKGROUND

Many existing data storage systems distribute data storage across a variety of different databases such that it becomes difficult to fully integrate data. Such existing data storage techniques may receive data from distinct service providers which use different data schema and data models such that data is not compatible in certain situations.

Another issue is processing and linking the varying types of data that may be stored in the databases. Manual techniques have been used to integrate, map, and link data using point-to-point integrations, but such techniques are prone to error, time consuming, and require high manual effort.

SUMMARY

Embodiments of the invention solve the above-mentioned problems by providing systems, methods, and computer-readable media for storing dynamic data in a semantic data store using a normalized data schema.

A first embodiment of the invention is directed to one or more non-transitory computer-readable media storing computer-executable instructions that, when executed by a processor, perform a method for storing dynamic data, the method comprising receiving a first set of data published as an event to an event service from a first external data source, wherein the first set of data comprises a first data type, storing the first set of data in a raw storage portion of a semantic data store, automatically determining one or more entities associated with the first set of data by predicting the one or more entities based on the first set of data, updating a semantic index for the first set of data, automatically transforming an original data schema of the first set of data into a normalized data schema associated with the semantic data store, and storing the first portion of data in a curated storage portion of the semantic data store based at least in part on the semantic index of the first set of data.

A second embodiment of the invention is directed to a method for storing dynamic data comprising receiving a first set of data published as an event to an event service from a first external data source, wherein the first set of data comprises a first data type, storing the first set of data in a raw storage portion of a semantic data store, updating a semantic index for the first set of data, automatically transforming an original data schema of the first set of data into a normalized data schema associated with the semantic data store, and storing the first portion of data in a curated storage portion of the semantic data store based at least in part on the semantic index of the first set of data.

A third embodiment of the invention is directed to a system for storing and managing dynamic data, the system comprising a semantic data store, and a dynamic data manager comprising at least one processor, the at least one processor programmed to receive a first set of data published as an event to an event service from a first external data source, wherein the first set of data comprises a first data type, store the first set of data in a raw storage portion of the semantic data store, update a semantic index for the first set of data, automatically transform an original data schema of the first set of data into a normalized data schema associated with the semantic data store, and store the first portion of data in a curated storage portion of the semantic data store based at least in part on the semantic index of the first set of data.

Additional embodiments of the invention are directed to a method for retrieving relevant data from a semantic data store based on a context indication and one or more search tokens.

Further, embodiments are directed to training a plurality of machine learning models using normalized data stored in a semantic data store. The data may have a normalized schema such that the data is readable by the plurality of machine learning models.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
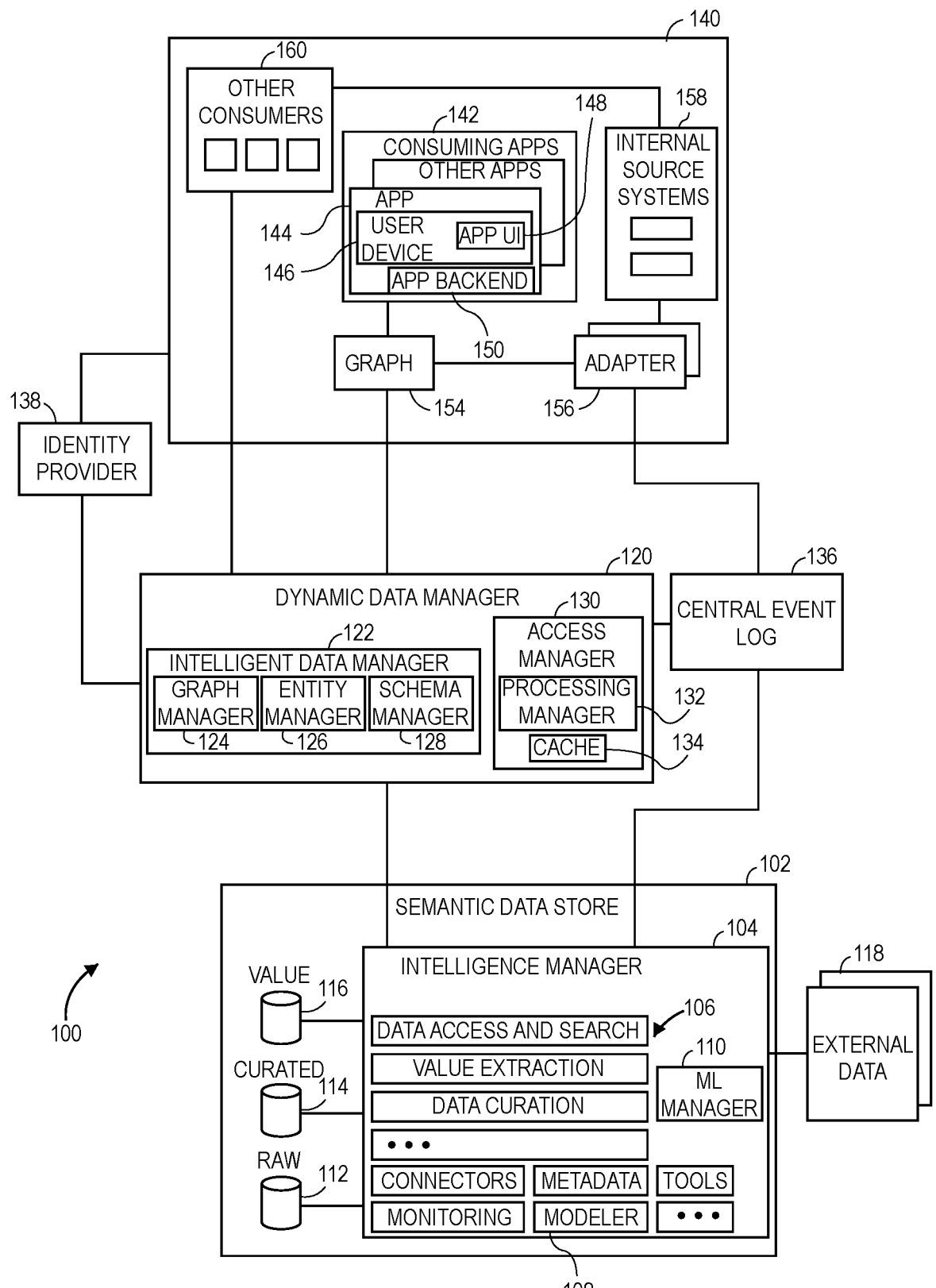
FIG. 1 depicts an exemplary system architecture relating to some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Embodiments are contemplated in which a semantic data schema is used to normalize data composed of distinct data types from a plurality of external and internal data sources. Said data may be curated and stored in a data store. The data may be indexed and stored such that the data is easily accessible and may be retrieved based on a search token or an entity indication associated with the data. In some embodiments, machine learning models may be employed to predict data relevancy and automatically organize the data across the data store.

Turning first to FIG. 1, an exemplary system architecture relating to some embodiments is depicted and is referred to generally by reference numeral 100. In such embodiments, the system 100 includes a semantic data store 102 comprising an intelligence manager 104 for managing data and processing within the semantic data store 102. The intelligence manager 104 may include a plurality of data pipelines 106, a plurality of management tools 108, and a machine learning manager 110. Further, in some embodiments, the semantic data store 102 further comprises a plurality of data storage portions, such as a raw data store 112, a curated data store 114, and a value data store 116, as shown, for storing various types of data.

In some embodiments, the plurality of data pipelines 106 comprises a variety of data pipelines such as a data access and search pipeline for managing data access and searching within the semantic data store 102, a value extraction pipeline for managing the value data store 116, for example by extracting high-value data from either of the curated data store 114 or the raw data store 112 to be stored in the value data store 116, a data curation pipeline for managing the curated data store 114 by curating data from the raw data store 112 to be stored in the curated data store 114, and one or more processing pipelines for processing information associated with the semantic data store 102. In some embodiments, a variety of additional data pipelines may be employed for managing data stored within the semantic data store 102, as well as inputting and outputting data associated with the semantic data store 102.

In some embodiments, the plurality of management tools 108 comprises any of a connections tool for managing connections to the semantic data store 102, a metadata tool for managing metadata for the data stored in the semantic data store 102, a monitoring tool for monitoring content in the semantic data store 102, and a modeler tool for adjusting various parameters of the semantic data store 102. In some embodiments, additional tools may be included for managing various content and communications across the semantic data store 102.

In some embodiments, the semantic data store 102 is configured to store data ranging from various different types. For example, each of structured data, semi-structured data, and unstructured data may be stored in the semantic data store 102. Further, the data may comprise multimedia content such as any combination of text, image, video, and audio, as well as other types of content. In some embodiments, all data is initially stored within the raw data store 112 of the semantic data store 102 until the data is curated. After curation, the curated data may be stored within the curated data store 114. The curated data may be analyzed using the value extraction pipeline of the plurality of pipelines to identify value data which may be re-indexed and stored in the value data store 116. Additionally, in some embodiments, the semantic data store 102 may be a remote, cloud-based data store remote from at least one other component of the system 100.

In some embodiments, the machine learning manager 110 comprises a machine learning algorithm. Alternatively, in some embodiments, the machine learning algorithm is executed elsewhere but interacts with the semantic data store 102 through the machine learning manager 110. In some embodiments, the machine learning manager 110 trains the machine learning algorithm using a set of training data which may include historic data related to the semantic data store 102. In some embodiments, the machine learning algorithm is trained to sort and organize various types of data across the storage portions of the semantic data store 102. For example, the machine learning algorithm may be configured based on the machine learning manager 110 to identify data within the raw data store 112 to be curated, curate the data, and store the curated data in the curated data store 114. Additionally, in some embodiments, the machine learning algorithm is configured to identify relevant content stored on any of data stores 112, 114, and 116 based on at least one of an entity indication, a context indication, or a search term.

In some embodiments, the machine learning manager 110 may be configured to train and manage a plurality of machine learning models. For example, the machine learning manager 110 may provide a specific solution for training machine learning algorithms using semantically-harmonized data stored in the semantic data store 102. Accordingly, training data may be uniformly provided in a normalized form such that the data is easily consumable by machine learning algorithms.

In some embodiments, one or more external data sources 118 are accessible to the semantic data store 102, for example, through one of the plurality of data pipelines 106. In some embodiments, the external data sources 118 may include any of news sources, information portals, click streams, data logs, external enterprise systems, as well as other sources of external content. In some embodiments, the semantic data store 102 automatically stores content from the one or more external data sources 118 within the raw data store 112. For example, in some embodiments, the semantic data store 102 may be subscribed to the external data sources 118 such that whenever a data event is published by one of the external data sources 118 the semantic data store 102 automatically retrieves content associated with the data event. Accordingly, embodiments are contemplated in which one or more distinct data types are received from one or more distinct external data sources. For example, a first data set may be received from a first external data source and a second data set may be received from a second external data source, where the second external data source is different from the first external data source and a type of the second data set is distinct from a type of the first data set.

Embodiments are contemplated in which data for the semantic data store 102 is retrieved via an automatic internet search method. For example, a data set may be received and stored in the semantic data store 102 after retrieval from a web crawler or knowledge mining application. Accordingly, an internet search application may be associated with the semantic data store 102 to automatically review and retrieve web-based data sources.

In some embodiments, the semantic data store 102 is communicatively coupled to a dynamic data manager 120 for controlling and interacting with the semantic data store 102. In some embodiments, the dynamic data manager 120 may be included as part of the semantic data store 102. Alternatively, the dynamic data manager 120 may be a separate component that communicates with the semantic data store 102, as shown. In some embodiments, the dynamic data manager 120 controls operation of the semantic data store 102 and interacts with the semantic data store 102 via one or more of the plurality of data pipelines 106. The dynamic data manager 120 may comprise an intelligent data manager 122 including a graph manager 124, an entity manager 126, and a schema manager 128. In some embodiments, the graph manager 124 is employed to index data of the semantic data store 102 into a semantic graph. In some embodiments, the semantic graph indexes data content based at least in part on an entity associated with the data content. Accordingly, the entity manager 126 may manage information associated with one or more entities which are associated with content stored on the semantic data store 102. In some embodiments, the entity manager 126 detects known entities and predicts new entities from data associated with the semantic data store 102. Accordingly, in some embodiments, the entity manager 126 annotates entities and the graph manager 124 uses the annotated entities to update the semantic index. In some such embodiments, the graph manager 124 determines information relating to relationships between entities and may predict entities for a set of data based on associations between entities. Alternatively, in some embodiments, the entity manager 126 stores information relating to a relationship between two or more entities such that associations may be made to predict relevancy of data relating to said two or more entities. Similarly, the schema manager 128 manages and stores the data schema of the semantic data store 102. In some embodiments, a normalized common schema associated with the semantic data store 102 is applied to at least a portion of the data stored in the semantic data store 102 such that said portion of the data may be parsed using the common schema of the semantic data store 102.

Additionally, in some embodiments, the dynamic data manager 120 comprises an access manager 130 including a processing manager 132 and a cache 134. The access manager 130 may manage access to content within the semantic data store 102. In some embodiments, the processing manager 132 manages processing for access management. Similarly, the cache 134 stores data relating to access, data sources, or other data relating to access within the semantic data store 102.

In some embodiments, the dynamic data manager 120 is communicatively coupled to a central event log 136. In some embodiments, the central event log 136 is included with or associated with an event service and comprises an event channel on which data events are published. Accordingly, the dynamic data manager 120 may be subscribed to the central event log 136 such that the dynamic data manager 120 receives any data events published to the central event log 136. In some embodiments, the semantic data store 102 may also be communicatively coupled to the central event log 136 via either a direct or indirect connection. For example, in some embodiments, information from the central event log 136 is communicated to the semantic data store 102 indirectly through the dynamic data manager 120.

Embodiments are contemplated in which the dynamic data manager 120 is configured to perform a plurality of processing operations such as, for example, recognizing external data schema from external data events, indexing data events and data sources with identified entities, detecting and identifying new entities, automatically linking newly detected entities, managing access to data sources, recommending data sources with similar index properties, predicting relevant data and entities based on a free text search input and the normalized schema, supplying data events to the semantic data store 102, retrieving an indication of relationships between structured entities, extracting structured content from unstructured search queries, and managing filter criteria for individual sources using structured query language (SQL) query generation. Further, in some embodiments, the dynamic data manager 120 automates the data curation process of the semantic data store 102 using the plurality of data pipelines 106 to instruct curation of the data. Accordingly, a user is not needed to manually curate the data which would be time consuming and prone to error such that data may be stored and indexed incorrectly. Additionally, since the dynamic data manager 120 may use a machine learning algorithm for data curation and organization, the curation process may become more accurate over time as the machine learning algorithm is trained.

In some embodiments, the dynamic data manager 120 is communicatively coupled to an identity provider 138, as shown. The identity provider 138 may be an identity provider service providing identity access information based on a plurality of identity roles and associated permissions. For example, in some embodiments the access manager 130 retrieves identity information from the identity provider 138 to authenticate a user, entity, or application before providing access to content on the semantic data store 102. Further, in some embodiments, the dynamic data manager 120 communicates with the identity provider 138 for determining access to content stored in the semantic data store 102 based on user identity information. Alternatively, in some embodiments, access may be determined based on entity identity information for a certain organization or some other type of identity information. For example, any user associated with a given organization may be granted access based on said entity identity information identifying the organization.

In some embodiments, the dynamic data manager 120 interacts with an external application environment 140 which may include one or more external applications or entities. In some embodiments, the external application environment 140 includes one or more consuming applications 142, for example, a first application 144 which may be executed on a user device 146 providing an application user interface 148 associated with the first application 144. Additionally, an application backend 150 may be provided for servicing the first application 144. In some embodiments, one or more other applications 152 may be included within the consuming applications 142. The consuming applications 142 may interact with the dynamic data manager 120 to consume content from the semantic data store 102. For example, in some embodiments, the dynamic data manager 120 provides a semantic graph 154 to the consuming applications 142, where the semantic graph 154 comprises information relating to content stored in the semantic data store 102. In some embodiments, the dynamic data manager 120 may provide a semantic graph 154 for each of a plurality of consuming applications. For example, a first semantic graph may be provided for the first application 144 and a second semantic graph may be provided for a second application. Further, in some embodiments, the semantic graph 154 comprises information relating to one or more entities and associations between said entities.

In some embodiments, one or more adapters 156 may be provided for adjusting data from the central event log 136.

For example, the adapters 156 may adjust the data schema of the content to normalize the data such that it is comprehendible by any of the consuming applications 142, the dynamic data manager 120, or the semantic data store 102. In some embodiments, one or more internal source systems 158 may be included. The internal source systems 158 may include data sources related to the semantic data store 102. For example, the semantic data store 102 may be associated with an enterprise resource planning (ERP) system that hosts a variety of other internal products and applications. Accordingly, content from the internal source systems 158 may be provided to the central event log 136 after normalization by the one or more adapters 156.

In some embodiments, a plurality of other consuming applications 160 may be included receiving content from the dynamic data manager 120. For example, the other consuming applications 160 may include additional consuming applications such as, machine learning models, data clouds, and analytics software. In some embodiments, the other consuming applications 160 may not necessarily be executed on a user device and may alternatively be associated with one or more servers or other processors. In some embodiments, data provided by the semantic data store 102 is used as training data to train a machine learning model, as described above.

In some embodiments, one or more of the communication connections between the components of the system 100 are carried out over a network, for example, a wireless or wired internet connection. Additionally or alternatively, one or more of the communication connections may be carried out over a local network such as an intranet connection. In some embodiments, communications between components may be carried out using one or more Application Programming Interfaces (APIs). For example, an API may be provided for facilitating communication between the dynamic data manager 120 and the semantic data store 102. Such an API may interface with the plurality of data Turning now to FIG. 2, an exemplary dashboard interface 200 is depicted relating to some embodiments. In some embodiments, the dashboard interface 200 may be generated for display as the application user interface 148 on the user device 146. Accordingly, the dashboard interface 200 may be generated for display within a graphical user interface allowing a user to view and interact with the consuming application. In some embodiments, the dashboard interface 200 may be associated with a consuming application using data retrieved from the semantic data store 102. In some such embodiments, the dashboard interface 200 may comprise a user selectable context 202. The user selectable context 202 may allow a user to select at least one of a plurality of contexts relating to entities and content stored in the semantic data store 102. For example, the user may select "Supplier Briefing" as the context such that supplier information is retrieved from the semantic data store 102 and generated for display on the dashboard interface 200. Additionally, the dashboard interface 200 may comprise a search bar 204 allowing the user to search data on the semantic data store 102 using a keyword or entity name. For example, in some embodiments, a user may type an entity name into the search bar 204 such that content relating to the entity is retrieved from the semantic data store 102 and generated for display on the dashboard interface 200. Accordingly, data stored in the semantic data store 102 may be indexed in association with one or more related contexts, entities, and other search tokens.

In some embodiments, a plurality of content renderings are generated for display as an analytics report on the dashboard interface 200. For example, the analytics report may comprise a relevant news rendering 206 including information relating to news content from the semantic data store 102, a company rendering 208 including information relating to a specific company from the semantic data store 102, a user rendering 210 including information relating to a specific user from the semantic data store 102, an analysis rendering 212 including analysis information comparing content from the semantic data store 102, a graph rendering 214 comparing content from the semantic data store 102, a quotations rendering 216 including sales/product information from the semantic data store 102, and a messaging rendering 218 including messages and feedback information from the semantic data store 102. In some embodiments, a variety of different renderings comprising different information may be generated for display on the dashboard interface 200. Additionally, in some embodiments, a plurality of the renderings described herein may be generated for display. For example, a first user rendering relating to a first relevant user and a second user rendering relating to a second relevant user may be included.

In some embodiments, the content generated for display is selected from the semantic data store 102 based on relevancy. For example, the content may be selected based on a relation to the selected context and selected entity or search term. In some embodiments, the dynamic data manager 120 may automatically determine relevant content based on the given context, entity, and index of the content stored in the semantic data store 102. In some embodiments, a machine learning model may be used to predict the relevant content. In some embodiments, additional objects may be included on the dashboard interface 200, such as, for example, a link to webpage, machine learning information, diagnostics information, and other relevant objects and information based on the selected context and search terms.

In some embodiments, the graph rendering 214 may be generated automatically by comparing one or more data sets retrieved from the semantic data store 102. For example, in the supplier briefing example shown, the graph rendering 214 may compare data associated with competitor products for benchmarking purposes. Accordingly, the data points in the graph rendering 214 may be automatically retrieved from the semantic data store 102. In some embodiments, different types of renderings may be selected based on the user selected context of the analytics report. For example, if the supplier briefing context is selected, the renderings shown in FIG. 2 may be generated, but if a purchaser briefing context is selected, different types of renderings may be generated. Further, embodiments are contemplated where the context may be automatically selected based on user information or user device information. For example, if a user is known to be a supplier sales representative based on user information stored on the user's user device, then the supplier briefing context may automatically be selected when the user accesses the dashboard interface 200.

Figure 3:
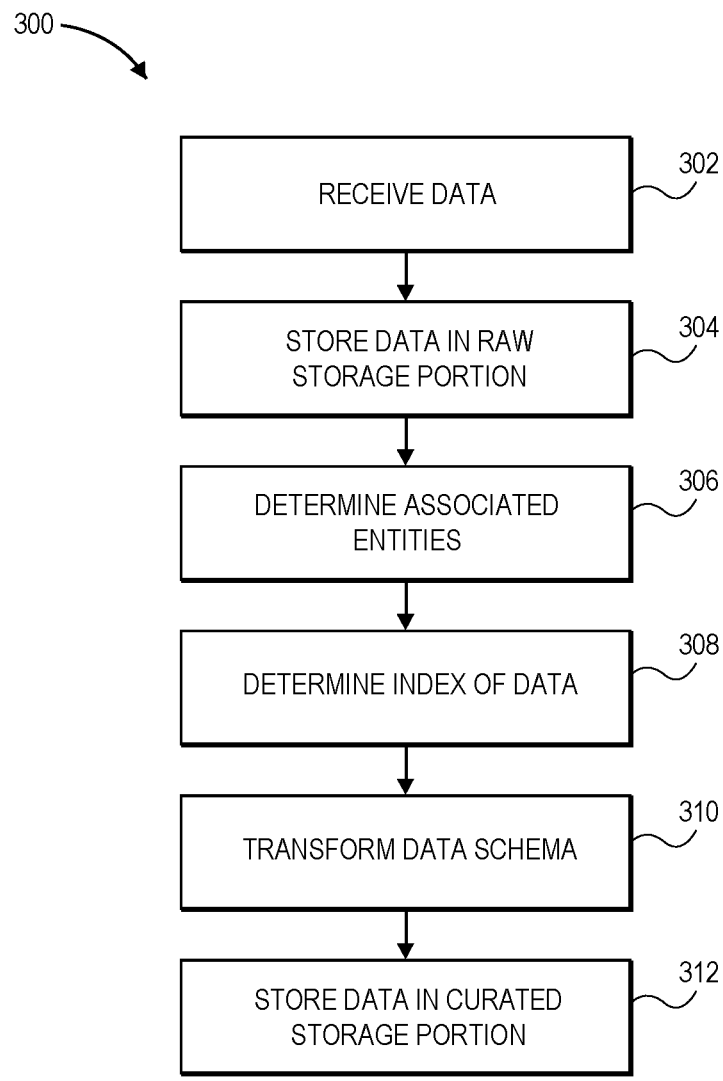
FIG. 3 depicts a method for dynamic data storage relating to some embodiments.

Turning now to FIG. 3, a dynamic data storage method 300 is depicted relating to some embodiments. In some embodiments, the method 300 may be performed on one or more processors associated with the dynamic data manager 120. Alternatively, in some embodiments, the steps of the method 300 may be separated between a processor of the dynamic data manager 120 and the semantic data store 102, where a first portion of the method steps are executed on the dynamic data manager 120 and a second portion of the steps are executed on the semantic data store 102.

At step 302 data is received. In some embodiments, the data may be received from an external source such as one of external data sources 118. In some embodiments, the data is received from the central event log 136 as event data published to an event channel. In some embodiments, the received data includes a set of data including at least one of a data header, associated metadata, and a data payload. In some embodiments, the received data comprises a change to existing data stored in the semantic data store 102. Embodiments are contemplated in which the data set does not comprise the data payload but the metadata includes a payload indication or payload identifier which may be used to access the data payload. For example, embodiments are contemplated in which the data set comprises metadata associated with a specific webpage and rather than including the entire webpage as a data payload, the metadata includes a hyperlink to the webpage.

At step 304 the data set is stored in the raw storage portion. Here, the data may be injected directly into the raw data store 112 via one of the data pipelines 106. At step 306 one or more entities associated with the data set are determined. In some embodiments, the entities are determined using the entity manager 126 of the dynamic data manager 120 by analyzing the data set. In some embodiments, entities may be determined based on an entity domain associated with the data set. At step 308 a semantic index is determined for the data. In some embodiments, the semantic index may be selected based at least in part on the associated entities. At step 310 the schema of the data is transformed into a normalized data schema associated with the semantic data store 102. In some embodiments, the data may be associated with an original external data schema. Accordingly, it may be desirable to change the original data schema to the normalized data schema for the semantic data store 102, such that the data may be easily organized and easily accessible within the semantic data store 102. At step 312 the data is stored in a curated storage portion of the semantic data store 102. Here, the data may be moved from the raw data store 112 to the curated data store 114 and stored as curated data along with the determined semantic index and updated data schema. In some embodiments, the curated data also includes an indication of the determined associated entities.

In some embodiments, the data stored in the semantic data store 102 does not include a data payload. Accordingly, embodiments are contemplated in which data is stored as virtual data without a payload such that the data payload may be referenced and accessible from meta data information stored in the metadata on the semantic data store 102. Accordingly, the semantic data store 102 may supply an indication of the data payload such that a consuming application may access the data payload using the indication. In some embodiments, virtual data may desirably reduce the storage load of the semantic data store 102 because the data payload may be stored elsewhere. As such, embodiments are contemplated in which at least a portion of the data stored in the semantic data store 102 does not comprise a data payload.

Figure 4:
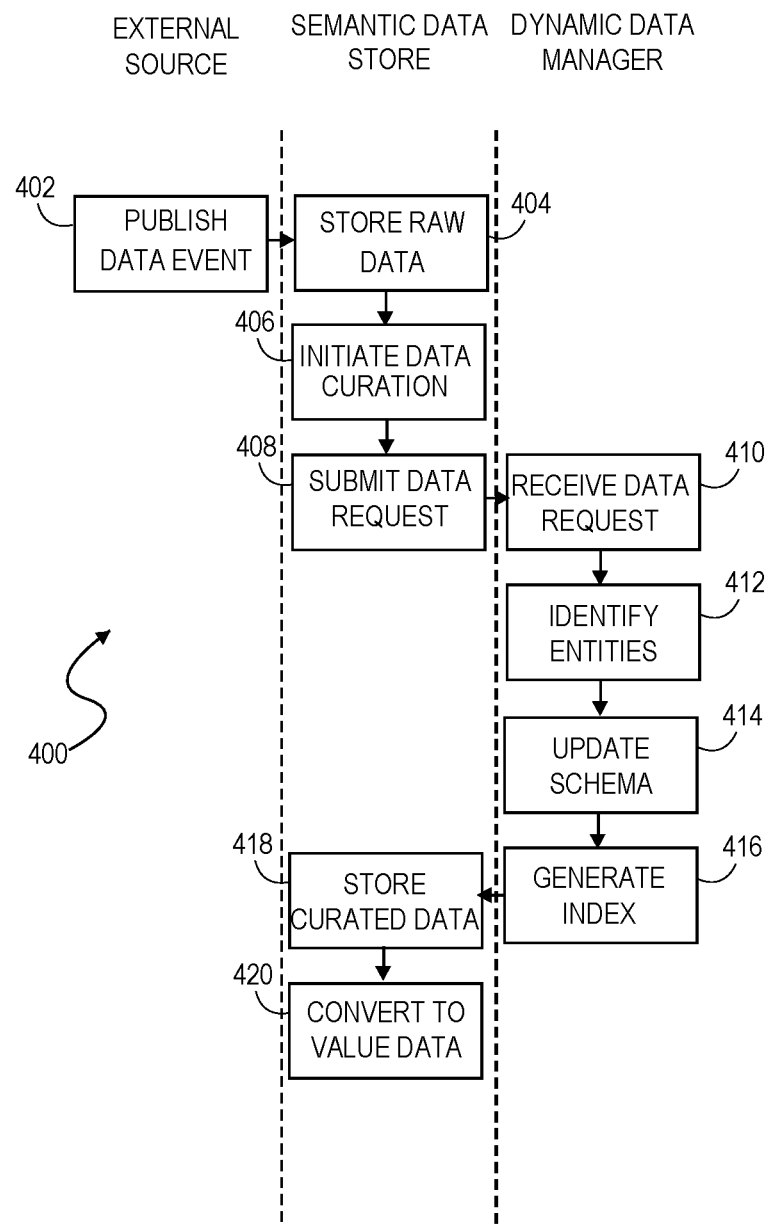
FIG. 4 depicts a swim lane diagram illustrating a dynamic data storage process relating to some embodiments.

Turning now to FIG. 4, a swim lane diagram illustrating the component responsibility flow of a process 400 for storing dynamic data is depicted relating to some embodiments. At step 402 an external source publishes a data event which may be the addition of a new data set or a change to an existing data set. In some embodiments, the data event is published to the central event log 136 such that the data event is accessible by the dynamic data manager 120 and the semantic data store 102. At step 404 the semantic data store 102 stores raw data associated with the data event into the raw data store 112. In some embodiments, the raw data comprises any of a data header, associated metadata, and a data payload. At step 406 data curation is initiated. In some embodiments, data curation may be initiated by retrieving the data from the raw data store 112. At step 408 a data request is submitted from the semantic data store 102 to the dynamic data manager 120 requesting curation of the data.

The dynamic data manager 120 receives the data request from the semantic data store 102 at step 410. In some embodiments, the data request comprises the raw data or an indication of the raw data. At step 412 the dynamic data manager 120 identifies one or more identities associated with the raw data. At step 414 the dynamic data manager 120 updates the data schema of the data to a normalized data schema for the semantic data store 102. At step 416 a semantic index for the data is generated or updated (if an index already exists). At step 418 the raw data from the raw data store 112 is converted to curated data including one or more of an indication of the identified entities, the updated schema, and the semantic index. The curated data is stored within the curated data store 114.

At step 420 the curated data is optionally converted into value data. For example, the value extraction data pipeline of the plurality of data pipeline may identify a specific value relation of the curated data. Here, a value indication may be determined associated with a given set of data. Responsive to determining the value indication, the value data may be stored in a value storage portion of the semantic data store 102 such as the value data store 116. In some embodiments, data may be stored in the value data store 116 for use with a specific external application such that the value data is easily accessible to the external application and contains proper formatting for the external application. In some embodiments, value data may be extracted based on a specific relation to a specific entity or to a specific consuming application and stored in the value data store 116. In some embodiments, the value data is also associated with a semantic index and a normalized schema, each of which may be updated based on the determined value. In some embodiments, similar sets of data may be stored in both the curated data store 114 and the value data store 116 with varying semantic indexes such that the data is easily accessible within the value data store 116 to a specific application.

In one example use case of the value data store 116, a specific user of the consuming application wishes to receive quotation information from a plurality of different vendor entities. Accordingly, the dynamic data manager 120 may instruct the semantic data store 102 to store said quotation data relating to said plurality of entities in the value data store 116. Accordingly, the quotation data may be automatically generated for display on the dashboard interface 200 of the user's device whenever the user selects, for example, a quotation context. Further, in some embodiments, the quotation data may be organized and ranked such that the quotation data may be displayed in a specific order. For example, the quotation data may be displayed in order of cost with the least expensive quote appearing first and more expensive quotes appearing next. In some embodiments, the dynamic data manager 120 may automatically determine what data should be stored in the value data store 116 based on user activity. For example, if a user commonly searches for quotation data then the quotation data may be stored in the value data store 116 such that the quotation data may be easily retrieved and a rendering associated with the quotation data may be generated for display.

Figure 5:
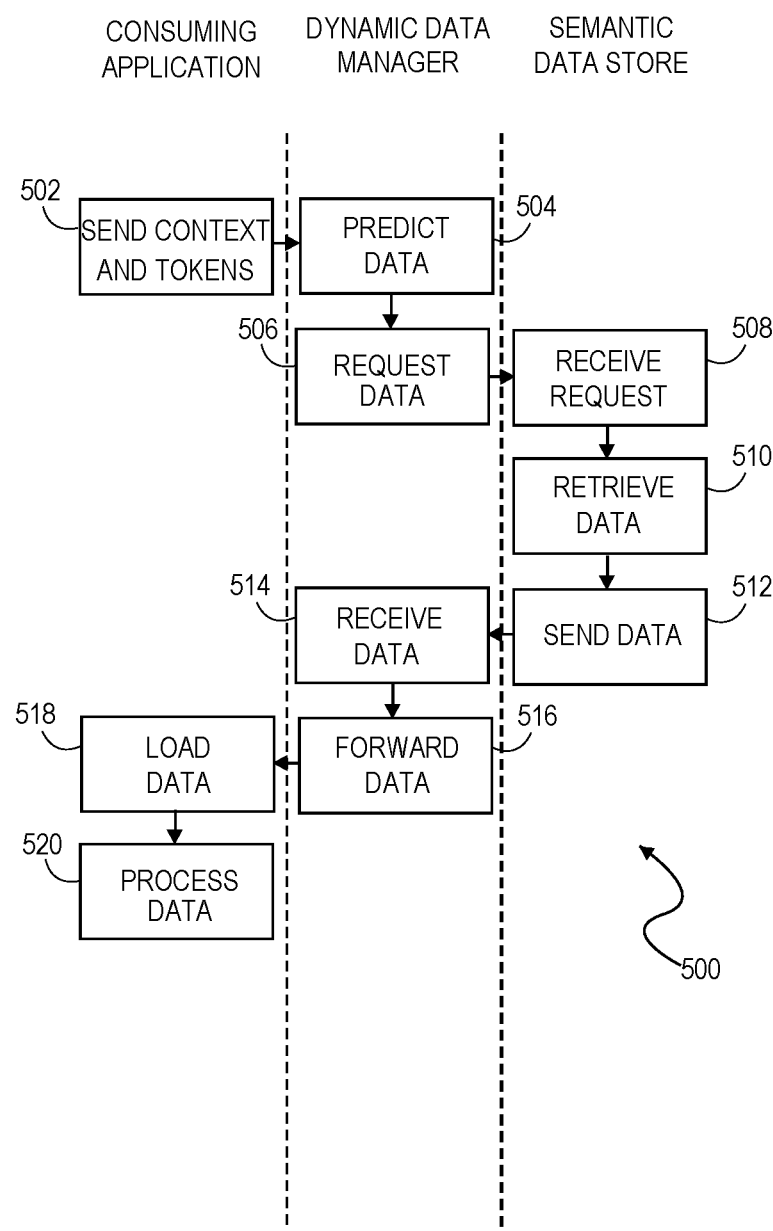
FIG. 5 depicts a swim lane diagram illustrating a relevant data retrieval process relating to some embodiments.

Turning now to FIG. 5, a swim lane diagram illustrating the component responsibility flow of a process 500 for retrieving relevant dynamic data is depicted relating to some embodiments. At step 502 a consuming application requests data retrieval by sending a context indication and one or more search tokens. In some embodiments, the context indication and one or more search tokens are sent as a search request to the dynamic data manager 120. In some embodiments, at least one of the search tokens identifies a specific entity. The dynamic data manager 120 receives the context indication and search tokens from the consuming application and predicts relevant data at step 504. In some embodiments, the relevant data may be determined based on the indices of data stored within the semantic data store 102 in either of the curated data store 114 or the value data store 116. For example, the dynamic data manager 120 may compare an entity identified by one of the search tokens to an entity indication associated with data in the semantic data store 102 to determine relevant data.

Figure 2:
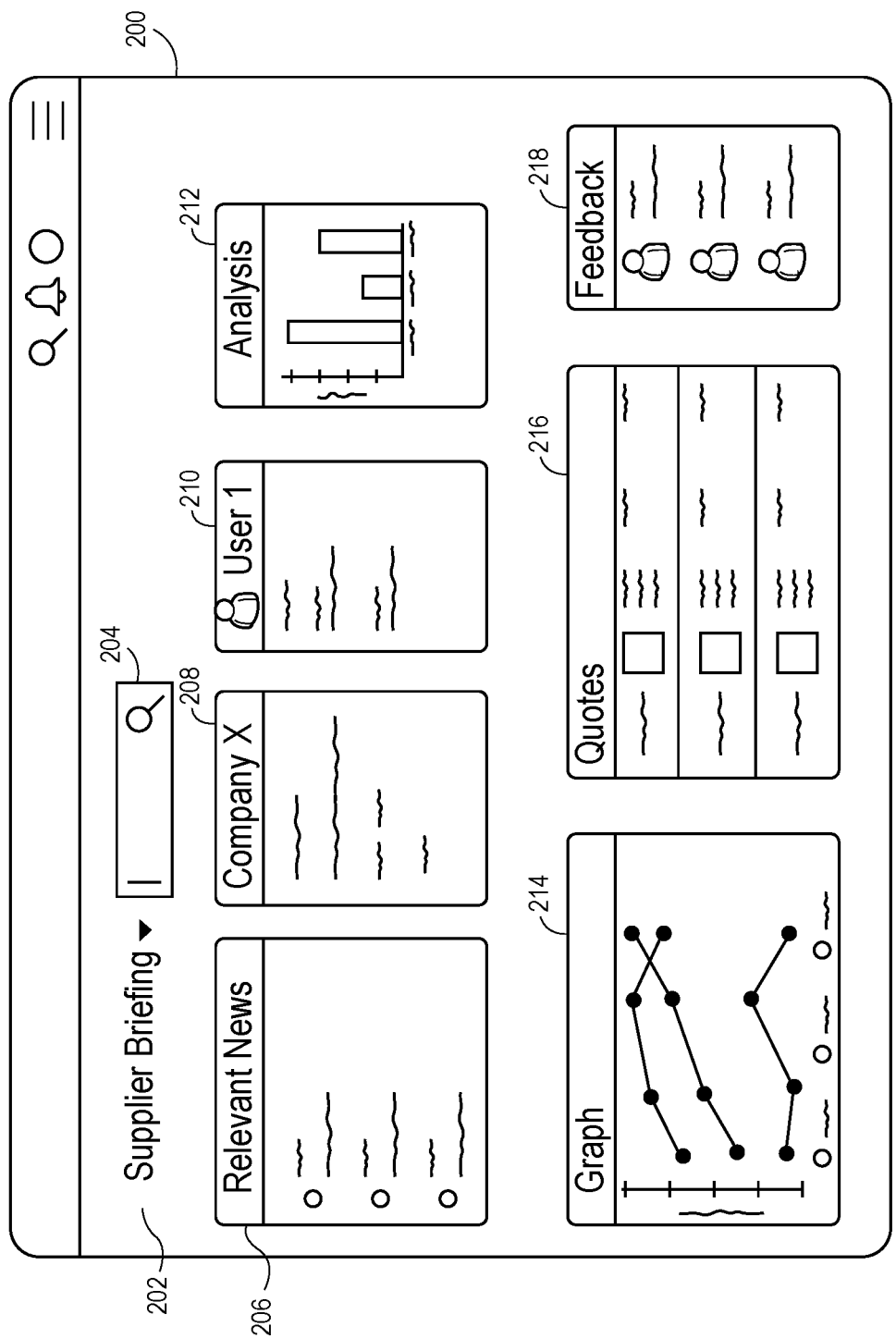
FIG. 2 depicts an exemplary dashboard interface relating to some embodiments.

At step 506, after the relevant data has been determined, the dynamic data manager 120 requests the relevant data from the semantic data store 102. In some embodiments, the dynamic data manager 120 may transmit a data request requesting one or more relevant sets of data to the semantic data store 102. The data request is received by the semantic data store 102 at step 508 and the semantic data store 102 retrieves the relevant data at step 510. At step 512 the semantic data store 102 sends the relevant data to the dynamic data manager 120. The dynamic data manager 120 receives the relevant data at step 514 and forwards the relevant data to the consuming application at step 516. At step 518 the consuming application loads the relevant data and processes the relevant data at step 520. In some embodiments, the relevant data is used to generate an analytics report on a user interface, such as dashboard interface 200 as shown in FIG. 2. Here, the relevant data may be processed to generate the plurality of renderings associated with the received relevant data.

Figure 6:
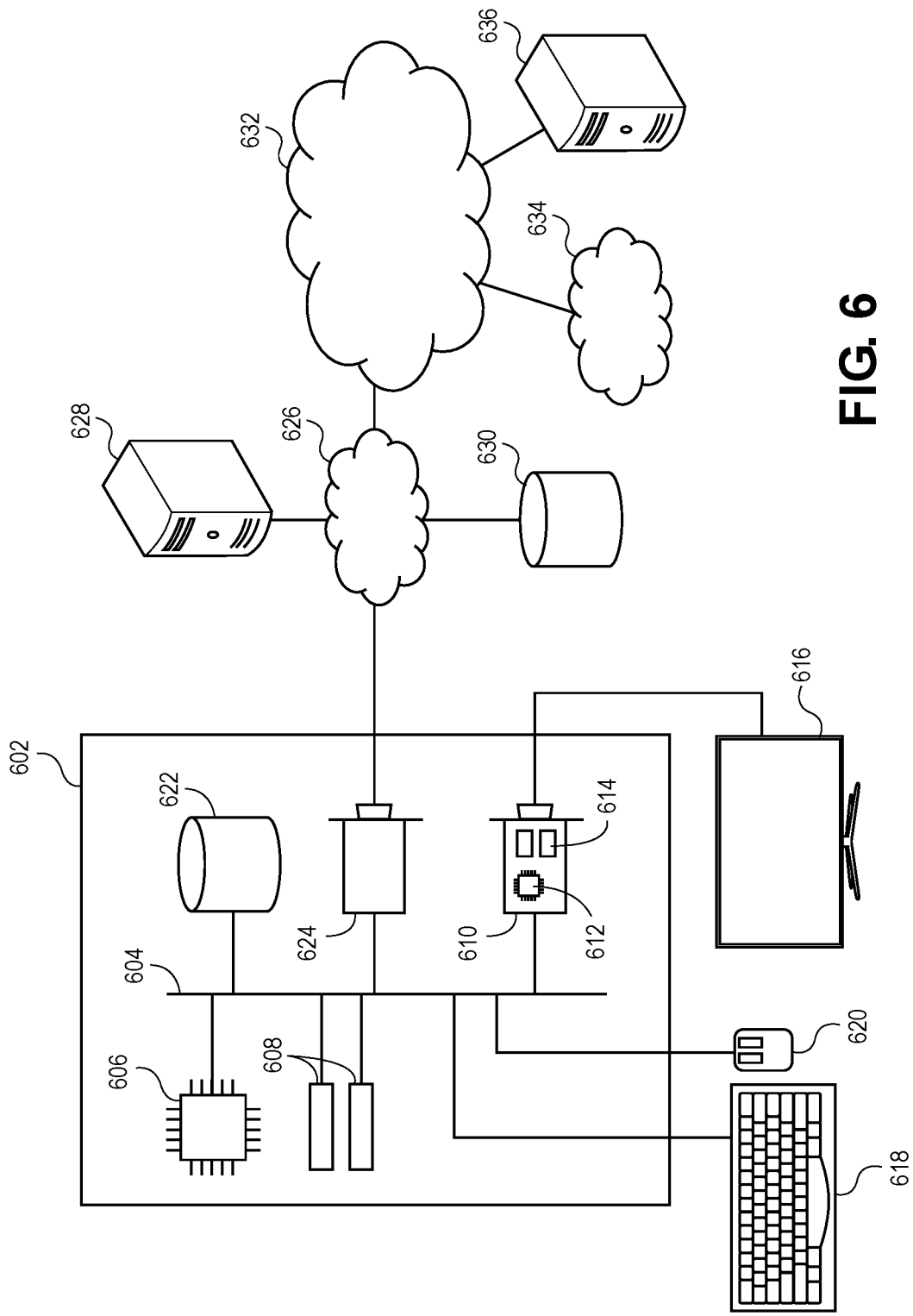
FIG. 6 depicts an exemplary hardware platform relating to some embodiments.

Turning now to FIG. 6, an exemplary hardware platform for certain embodiments of the invention is depicted. Computer 602 can be a desktop computer, a laptop computer, a server computer, a mobile device such as a smartphone or tablet, or any other form factor of general- or special-purpose computing device. Depicted with computer 602 are several components, for illustrative purposes. In some embodiments, certain components may be arranged differently or absent. Additional components may also be present. Included in computer 602 is system bus 604, whereby other components of computer 602 can communicate with each other. In certain embodiments, there may be multiple busses or components may communicate with each other directly. Connected to system bus 604 is central processing unit (CPU) 606. Also attached to system bus 604 are one or more random-access memory (RAM) modules 608. Also attached to system bus 604 is graphics card 610. In some embodiments, graphics card 610 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also on graphics card 610 is GPU memory 614. Connected (directly or indirectly) to graphics card 610 is display 616 for user interaction. In some embodiments no display is present, while in others a display is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media, and may be internally installed in computer 602 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the IEEE 802.11 family of standards). NIC 624 connects computer 602 to local network 626, which may also include one or more other computers, such as computer 628, and network storage, such as data store 630. Generally, a data store such as data store 630 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 628, accessible on a local network such as local network 626, or remotely accessible over Internet 632. Local network 626 is in turn connected to Internet 632, which connects many networks such as local network 626, remote network 634 or directly attached computers such as computer 636. In some embodiments, computer 602 can itself be directly connected to Internet 632.

In some embodiments, one or more of the components described above with respect to FIG. 6 may be included in the system 100 of FIG. 1. For example, in some embodiments, the dynamic data manager 120 may include at least one processor, such as CPU 606 for processing any of the functions described herein with respect to the dynamic data manager 120. Similarly, the semantic data store 102 and the user device 146 may include one or more components from FIG. 6.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for storing dynamic data, the method comprising:

receiving a first set of data published as an event to an event service from a first external data source, wherein the first set of data comprises a first data type;

storing the first set of data in a raw storage portion of a semantic data store;

automatically determining one or more entities associated with the first set of data by predicting the one or more entities based on the first set of data;

updating a semantic index for the first set of data;

automatically transforming an original data schema of the first set of data into a normalized data schema associated with the semantic data store; and storing the first portion of data in a curated storage portion of the semantic data store based at least in part on the semantic index of the first set of data.

2. The media of claim 1, further comprising:

receiving, from an external application, a search request comprising a context indication and one or more search tokens;

predicting, using a machine learning algorithm, one or more relevant sets of data based on the context indication and the one or more search tokens;

transmitting, to the semantic data store, a data request requesting the one or more relevant sets of data;

receiving, from the semantic data store, the one or more relevant sets of data; and forwarding, to the external application, the one or more relevant sets of data.

3. The media of claim 2, further comprising:

generating a dashboard interface for display within a graphical user interface, the dashboard interface comprising information indicative of the one or more relevant sets of data.

4. The media of claim 3, wherein the dashboard interface further comprises information indicative of the one or more entities.

5. The media of claim 3, wherein the dashboard interface further comprises an automatically generated graph rendering based at least in part on the one or more relevant sets of data.

6. The media of claim 1, further comprising:

receiving a second set of data published as an event to an event service from a second external data source, wherein the second set of data comprises a second data type distinct from the first data type; and storing the second set of data in the semantic data store.

7. The media of claim 6, wherein the first set of data comprises one of structured data, semi-structured data, or unstructured data.

8. A method for storing dynamic data comprising:

receiving a first set of data published as an event to an event service from a first external data source, wherein the first set of data comprises a first data type;

storing the first set of data in a raw storage portion of a semantic data store;

updating a semantic index for the first set of data;

automatically transforming an original data schema of the first set of data into a normalized data schema associated with the semantic data store; and storing the first portion of data in a curated storage portion of the semantic data store based at least in part on the semantic index of the first set of data.

9. The method of claim 8, further comprising automatically determining one or more entities associated with the first set of data using a machine learning algorithm to predict the one or more entities based on the first set of data.

10. The method of claim 8, wherein the first set of data comprises at least one of a data header, metadata, and a data payload.

11. The method of claim 8, wherein the first set of data is retrieved using a web crawler.

12. The method of claim 8, further comprising:

determining a value indication associated with the first portion of data; and responsive to determining the value indication, storing the first portion of data in a value storage portion of the semantic data store for use with an external application.

13. The method of claim 8, wherein the semantic data store is a remote, cloud-based data store.

14. The method of claim 8, wherein at least a portion of data stored in the semantic data store is used as training data to train a machine learning algorithm, and wherein the portion of data comprises the normalized data schema such that the portion of data is readable by the machine learning algorithm.

15. A system for storing and managing dynamic data, the system comprising:

a semantic data store; and a dynamic data manager comprising at least one processor, the at least one processor programmed to:

receive a first set of data published as an event to an event service from a first external data source, wherein the first set of data comprises a first data type;

store the first set of data in a raw storage portion of the semantic data store;

update a semantic index for the first set of data;

automatically transform an original data schema of the first set of data into a normalized data schema associated with the semantic data store; and store the first portion of data in a curated storage portion of the semantic data store based at least in part on the semantic index of the first set of data.

16. The system of claim 15, wherein the at least one processor is further programmed to:

receive a second set of data published as an event to an event service from a second external data source, wherein the second set of data comprises a second data type distinct from the first data type; and store the second set of data in the semantic data store.

17. The system of claim 16, wherein the at least one processor is further programmed to:

receive, from an external application, a search request comprising a context indication and one or more search tokens;

predict, using a machine learning algorithm, one or more relevant sets of data based on the context indication and the one or more search tokens, wherein the one or more relevant sets of data comprises at least a portion of data from each of the first set of data and the second set of data;

transmit, to the semantic data store, a data request requesting the one or more relevant sets of data;

receive, from the semantic data store, the one or more relevant sets of data; and forward, to the external application, the one or more relevant sets of data.

18. The system of claim 17, wherein the at least one processor is further programmed to:

generate a dashboard interface for display within a graphical user interface of at least one user device, the dashboard interface comprising information indicative of the one or more relevant sets of data.

19. The system of claim 15, wherein the dynamic data manager communicates with an identity provider service for determining access to content stored in the semantic data store based on user identity information.

20. The system of claim 15, wherein the processor is further programmed to:
 automatically determine one or more entities associated with the first set of data by predicting the one or more entities based on the first set of data using a machine learning algorithm.

\* \* \* \* \*